US010121394B2

(12) United States Patent
Lundgren

(10) Patent No.: US 10,121,394 B2
(45) Date of Patent: Nov. 6, 2018

(54) DISPLAY SYSTEM ARRANGEMENT AND DISPLAY SYSTEM COMPRISING SUCH DISPLAY SYSTEM ARRANGEMENT

(71) Applicant: EXPOLINC AB, Bromma (SE)

(72) Inventor: Andreas Lundgren, Stockholm (SE)

(73) Assignee: Expolinc AB (SE)

( * ) Notice: Subject to any disclaimer, the term of this patent is extended or adjusted under 35 U.S.C. 154(b) by 0 days.

(21) Appl. No.: 15/569,877

(22) PCT Filed: Apr. 25, 2016

(86) PCT No.: PCT/SE2016/050365
§ 371 (c)(1),
(2) Date: Oct. 27, 2017

(87) PCT Pub. No.: WO2016/175700
PCT Pub. Date: Nov. 3, 2016

(65) Prior Publication Data

US 2018/0130384 A1 May 10, 2018

(30) Foreign Application Priority Data

Apr. 30, 2015 (SE) ....................................... 1550537

(51) Int. Cl.
*G06F 7/20* (2006.01)
*G09F 7/20* (2006.01)
*G09F 15/00* (2006.01)
*G09F 7/18* (2006.01)

(52) U.S. Cl.
CPC ............ *G09F 7/20* (2013.01); *G09F 15/0018* (2013.01); *G09F 15/0037* (2013.01); *G09F 2007/1834* (2013.01); *G09F 2007/1856* (2013.01)

(58) Field of Classification Search
CPC .... G09F 7/20; G09F 15/0018; G09F 15/0037; G09F 2007/1834; G09F 2007/1856
See application file for complete search history.

(56) References Cited

U.S. PATENT DOCUMENTS 1,701,236 A * 2/1929 Jones ........................ G09F 1/14 40/603
4,373,570 A * 2/1983 Nussdorf ................. A47G 5/00 160/351
2010/0293828 A1* 11/2010 Flagg .................. G09F 15/0068 40/605

(Continued)

FOREIGN PATENT DOCUMENTS

CN 103632622 A 3/2014

OTHER PUBLICATIONS

International Search Report and Written Opinion for International Application No. PCT/SE2016/050365, dated Aug. 28, 2016—8 Pages.

*Primary Examiner* — Gary C Hoge
(74) *Attorney, Agent, or Firm* — RatnerPrestia

(57) ABSTRACT

A display system arrangement for displaying a sheet of material, includes at least two length adjustable posts, each including a coupling device connected thereto, and a cross-bar extending between the coupling devices that is configured to receive the sheet of material to be displayed. Each coupling device includes a resilient joint arranged between the post and the holder. Also disclosed herein is a display system including such a display system arrangement.

9 Claims, 5 Drawing Sheets

(56) References Cited

U.S. PATENT DOCUMENTS

| | | | | |
|---|---|---|---|---|
| 2013/0112820 | A1* | 5/2013 | Zarelius | G09F 15/0062 248/158 |
| 2016/0267824 | A1* | 9/2016 | Lacross | G09F 17/00 |
| 2017/0053571 | A1* | 2/2017 | Wormser | G09F 15/0025 |
| 2018/0040265 | A1* | 2/2018 | Lawson | G09F 15/0025 |

* cited by examiner

DISPLAY SYSTEM ARRANGEMENT AND DISPLAY SYSTEM COMPRISING SUCH DISPLAY SYSTEM ARRANGEMENT

CROSS REFERENCE TO RELATED APPLICATIONS

This application is the U.S. national phase application of PCT International Application No. PCT/SE2016/050365, filed Apr. 25, 2016, which claims priority to Swedish Patent Application No. SE 1550537-3, filed Apr. 30, 2015, the contents of each application being incorporated by reference herein in their entirety.

TECHNICAL FIELD OF THE INVENTION

The present invention relates generally to the field of devices for displaying information printed on a sheet of material, such as company logos, advertisements, backgrounds, etc. Such devices can preferably be used by a company at a trade fair, exhibition, etc. Further, the present invention relates specifically to the field of display systems for displaying a sheet of material. The present invention also relates to a display system arrangement comprising at least two length adjustable posts, each of said at least two post comprising a coupling device connected thereto, and a crossbar extending between said coupling devices and configured to receive said sheet of material to be displayed, wherein each coupling device comprises a holder for engagement with said crossbar.

BACKGROUND OF THE INVENTION

Display systems for displaying printed sheets or fabrics are well known and used and comprises one or more posts and a frame or a crossbar stretching/carrying the sheet or fabric to be displayed. Displaying larger fabrics usually requires two or more posts and an upper and a lower crossbar.

CN103632622 relates to a display panel system with an upper and a lower crossbar which may have a straight or curved shape. The upper crossbar is mounted with a holder having a fork-shaped end and a snap-in part where the latter is snapped over the upper crossbar.

A problem is that a display system for displaying a sheet material or fabric with a crossbar extending between two posts does not allow adjusting the length of one post at the time due to the fixed crossbar. The crossbar will snap out of the holder or the holder may break due to twisting. Still, there is no disclosure in the prior art how to adjust the length or height of the posts in a display system having a crossbar without damaging the fabric or the display system.

OBJECT OF THE INVENTION

The present invention aims at obviating the aforementioned disadvantages and failings of previously known prior art, and at providing an improved display system. A primary object of the present invention is to provide an improved connection device of the initially defined type which allows adjustment of the length of the posts, one post at the time.

SUMMARY OF THE INVENTION

According to the invention at least the primary object is attained by means of the initially defined display system arrangement and display system having the features defined in the independent claims. Preferred embodiments of the present invention are further defined in the dependent claims.

According to a first aspect of the present invention, there is provided a display system arrangement of the initially defined type, which is characterized in that each coupling device comprises a resilient joint arranged between the post and said holder. According to a second aspect of the present invention, there is provided a display system comprising such a display system arrangement and a sheet of material.

Thus, the present invention is based on the insight of allowing the holder of the coupling device to incline in relation to the post by means of a resilient joint there will be no stress in the coupling device or in the engagement between the holder and the crossbar. Thus, one person may adjust the height of the display system one post at the time.

In a preferred embodiment of the present invention, the resilient joint is configured to allow the holder to incline in any direction, i.e. the crossbar may tilt in any direction.

According to a preferred embodiment, an upper end of the respective post is hollow and the coupling device comprises a first part inserted into the upper end and the resilient joint is arranged between the first part and the holder. Thereby the coupling devices are easily attached to the respective posts.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

In the present application the term "sheet of material" shall mean any sheet shaped material, preferably flexible enough to be folded. The sheet material is not limited to any specific type of material and may be a natural or synthetic material such as cotton, wool, paper or plastic, etc. or any combination thereof. In one embodiment the sheet of material is a fabric. The fabric may be made by knitting, weaving, spreading, crocheting or bonding.

The display system arrangement according to the present invention aims at solving the problem of mounting and dismounting a display system having a crossbar in a simple and controllable fashion without damaging the sheet of material or the display system arrangement. The present invention facilitates the display system to be mounted and dismounted by a single person.

Figure 1:
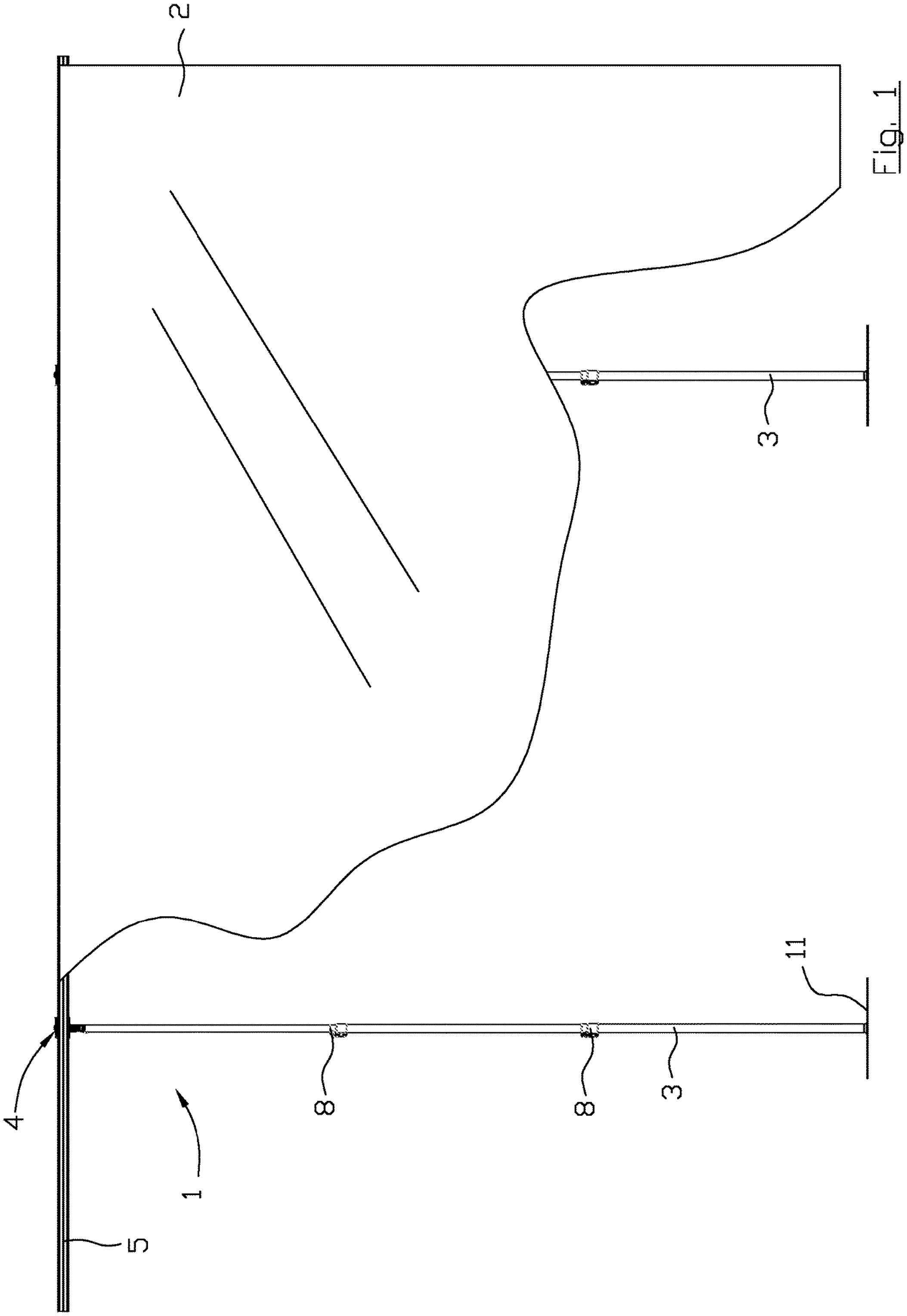
FIG. 1 is a schematic front view of the inventive display system, wherein a part of the sheet of material is removed.
Figure 2:
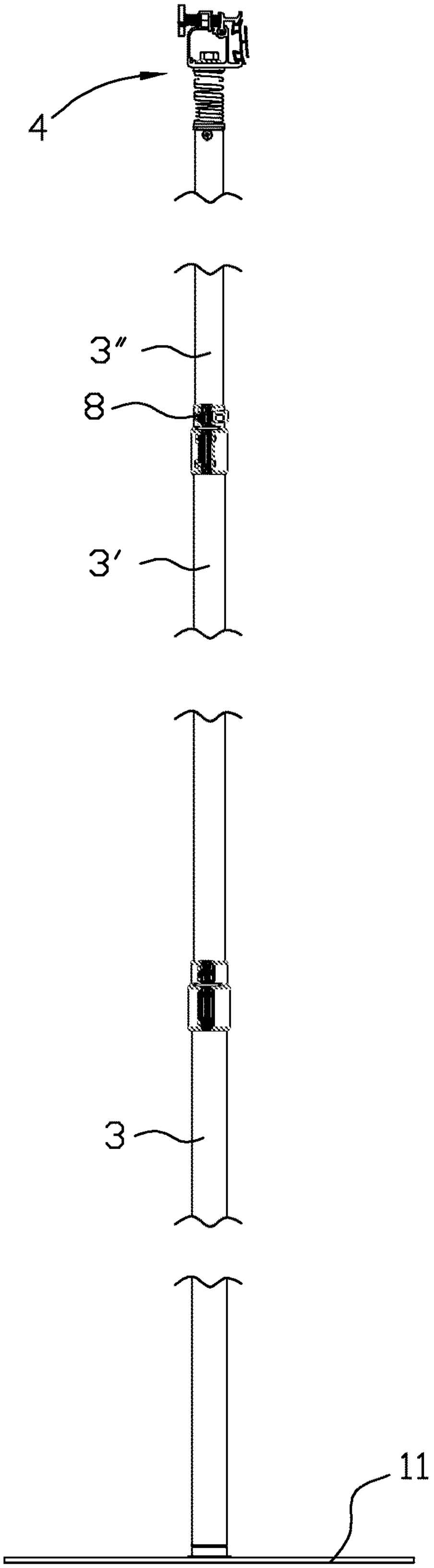
FIG. 2 is a schematic side view of the inventive display system arrangement.
Figure 3:
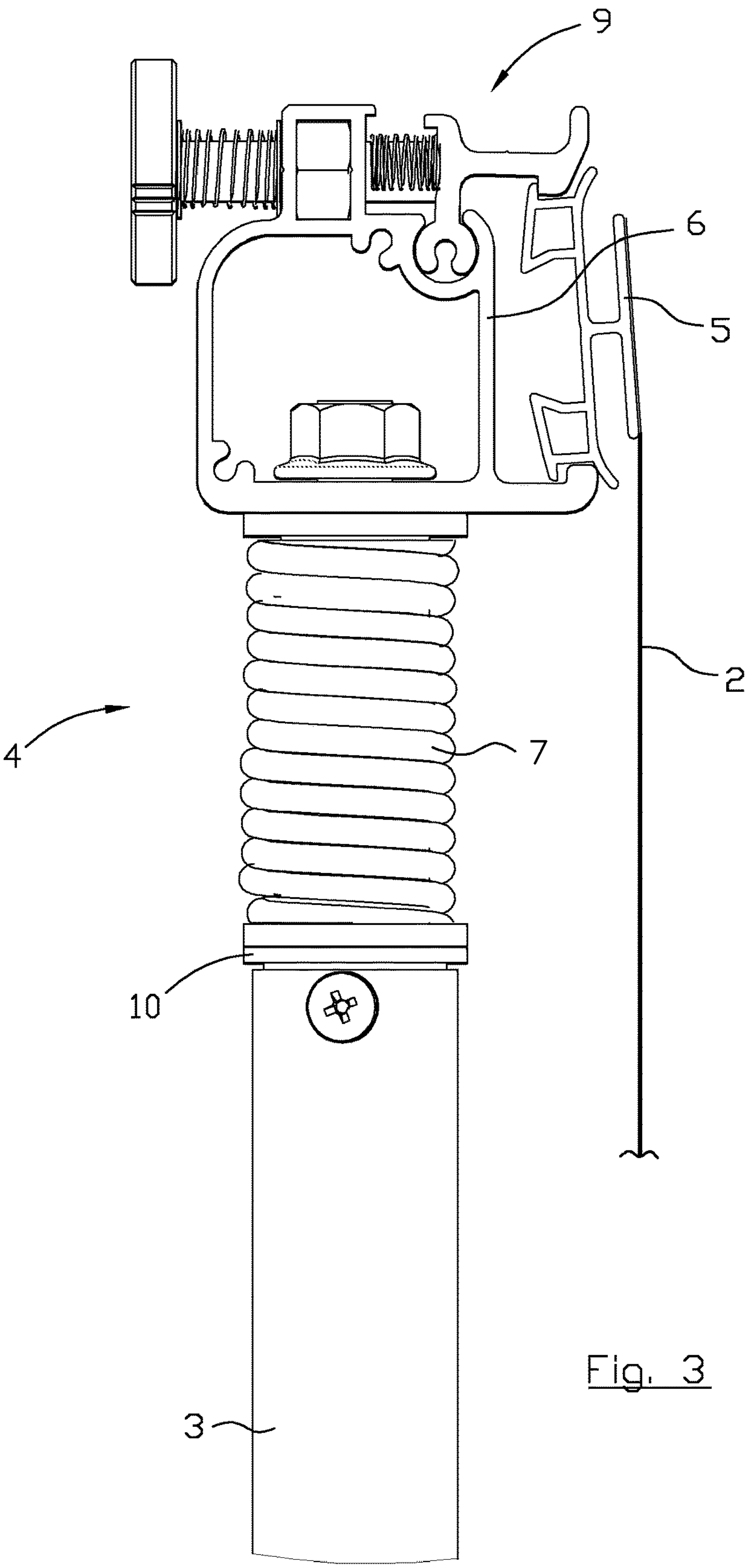
FIG. 3 is an enlarged schematic side view of a preferred embodiment of the coupling device.

Referring now to FIGS. 1, 2 and 3. The display system arrangement, generally designated 1, according to the present invention may be used for displaying a sheet of material 2 and comprises at least two posts 3 which length may be adjusted and at least one coupling device 4 is connected to each post 3. A crossbar 5 extends between the coupling devices 4 and is configured to receive the sheet of material 2 to be displayed. Each coupling device 4 comprises a holder 6 for engagement with the crossbar 5, and a resilient joint 7 arranged between the post 3 and said holder 6. The coupling device 4 may comprise further elements arranged between the resilient joint 7 and the holder 6 and/or the resilient joint 7 and the post 3.

The length adjustable posts 3 may be configured in any suitable way in order to allow adjustment of the length (or height) of the post 3, and thereby the height of the display system arrangement 1. The post 3 may comprise a first tube 3' and a second tube or rod 3", the outer diameter of the second tube 3" being smaller than the inner diameter of the first tube 3' in order for the second tube or post 3" to be inserted into the first tube 3' in a telescopic relation, and means 8 for fixating the position of the second tube or post 3" in relation to the first tube 3'. The length is adjusted by inserting or extending the second tube 3" into or out of the first tube 3' and fixating the second tube 3" at the requested position. The means 8 for fixating the position may be a conventional clamp having an eccentric lever. In one embodiment the posts 3 are telescopic masts. It shall also be pointed out that each post 3 may comprise more than two telescopically arranged tubes. The height of the display system arrangement is usually in the range of 2-4 meters, however the invention is not limited to this range and higher as well as lower display system arrangements are feasible.

The coupling device 4 comprises the resilient joint 7 and said holder 6. The holder 6 is configured to connect to the crossbar 5 using any suitable connection means 9. In the preferred embodiment the connection means 9 of the holder 6 comprises a lever arrangement securing the crossbar 5. The coupling device 4 should preferably be able to be positioned anywhere along the crossbar 5 making the display system more flexible concerning the positioning of the posts 3 due to the shape of the crossbar or any differences in height or unevenness on the ground or floor for example. In one embodiment the connection means 9 and the crossbar 5 are configured to allow the connection means 9 to slide along the crossbar 5. The coupling device 4 may comprise a fixation means, such as a screw, in order to fixate the position of the coupling device 4 on the crossbar 5. In one embodiment the display system comprises at least two crossbars preferably one of the crossbars is arranged at the lower end of the sheet of material. The lower crossbar does not need to be connected to the posts 3.

The resilient joint 7 is configured to allow inclination or bending, preferably in any direction meaning that the resilient joint 7 may be bent for example forward or backward or to the sides or in any direction in relation to the corresponding post. In one embodiment the resilient joint 7 is a coil spring. In another embodiment the resilient joint 7 is a tube or rod made of a resilient material such as rubber.

The coupling device 4 may be connected to the post 3 using any suitable means 10. In one embodiment an upper end of the post 3 is hollow having an inner diameter and the means 10 has an outer diameter smaller than said inner diameter to allow insertion of the means 10 into the upper end of the post 3. In another embodiment the top section of the post 3 has an outer diameter and the means 10 of the coupling device 4 is hollow with an inner diameter larger than said outer diameter in order to allow insertion of the top section of the post 3 into the means 10 of the coupling device 4. In another embodiment the coupling device 4 is connected to the post by means of a clamp. The resilient joint 7 is arranged between the means 10 and the holder 6. It shall be pointed out that the coupling device 4 may comprise a rod, or the like, arranged between the resilient joint 7 and the holder 6 such that there is a distance between the resilient joint 7 and the holder 6. The coupling device 4 may also comprise several resilient joints arranged in series between the post 3 and the holder 6.

The coupling device 4 may be arranged at any position along the post 3. In one embodiment each coupling device 4 is connected to the corresponding post 3 at an upper end thereof.

Each post preferably comprises a structural support 11 in order to provide stability and preventing the display system arrangement 1 from tipping over. The support 11 may be a foot, bearing pile, braces or supporting legs arranged at the lower end of the post 3 and releasably connected to the post 3. The structural support may be length adjustable, foldable, extendable, or the like, in order to be transported in a convenient way.

Figure 4:
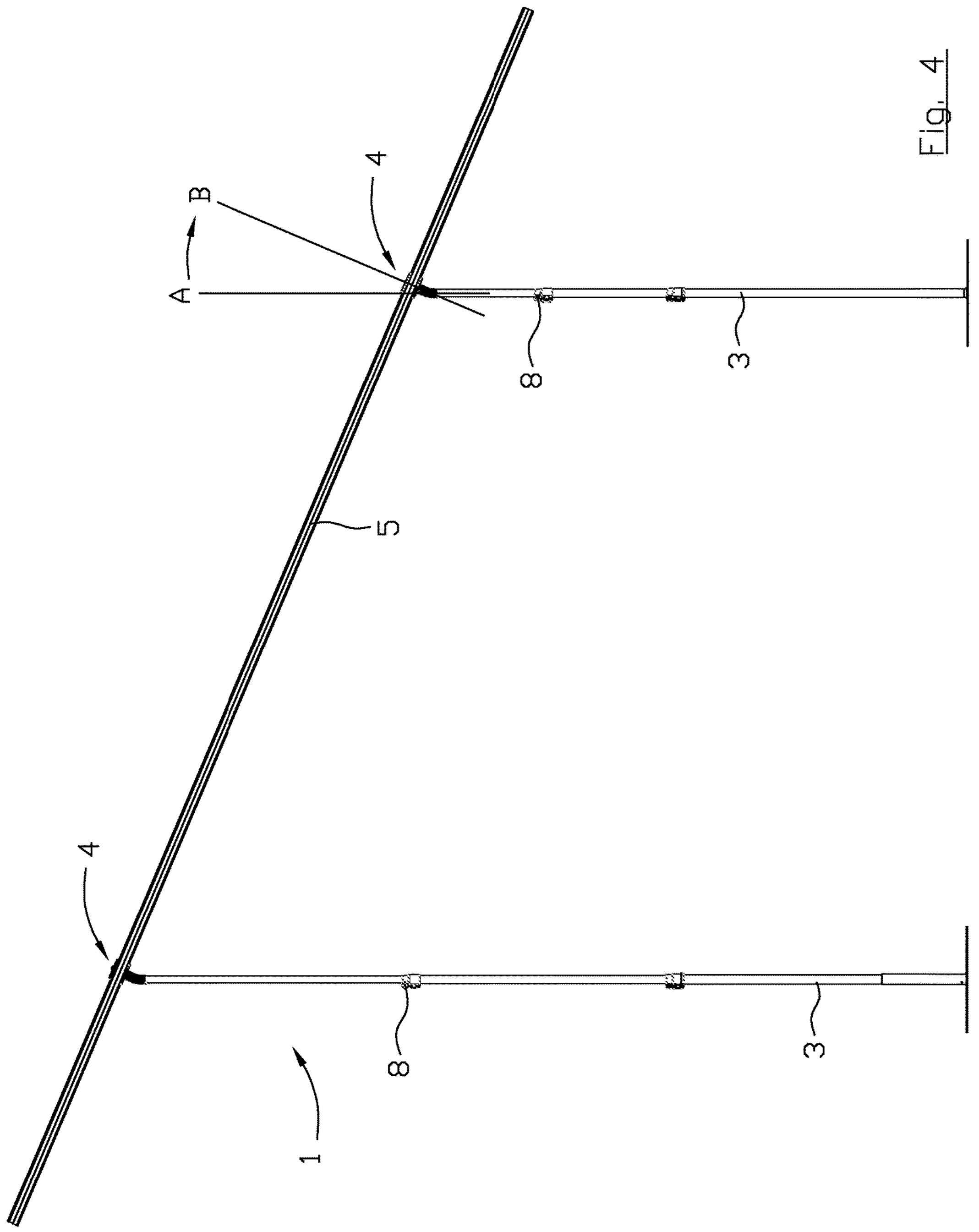
FIG. 4 is a schematic front view of the display system arrangement during adjustment of the height of one post.
Figure 5:
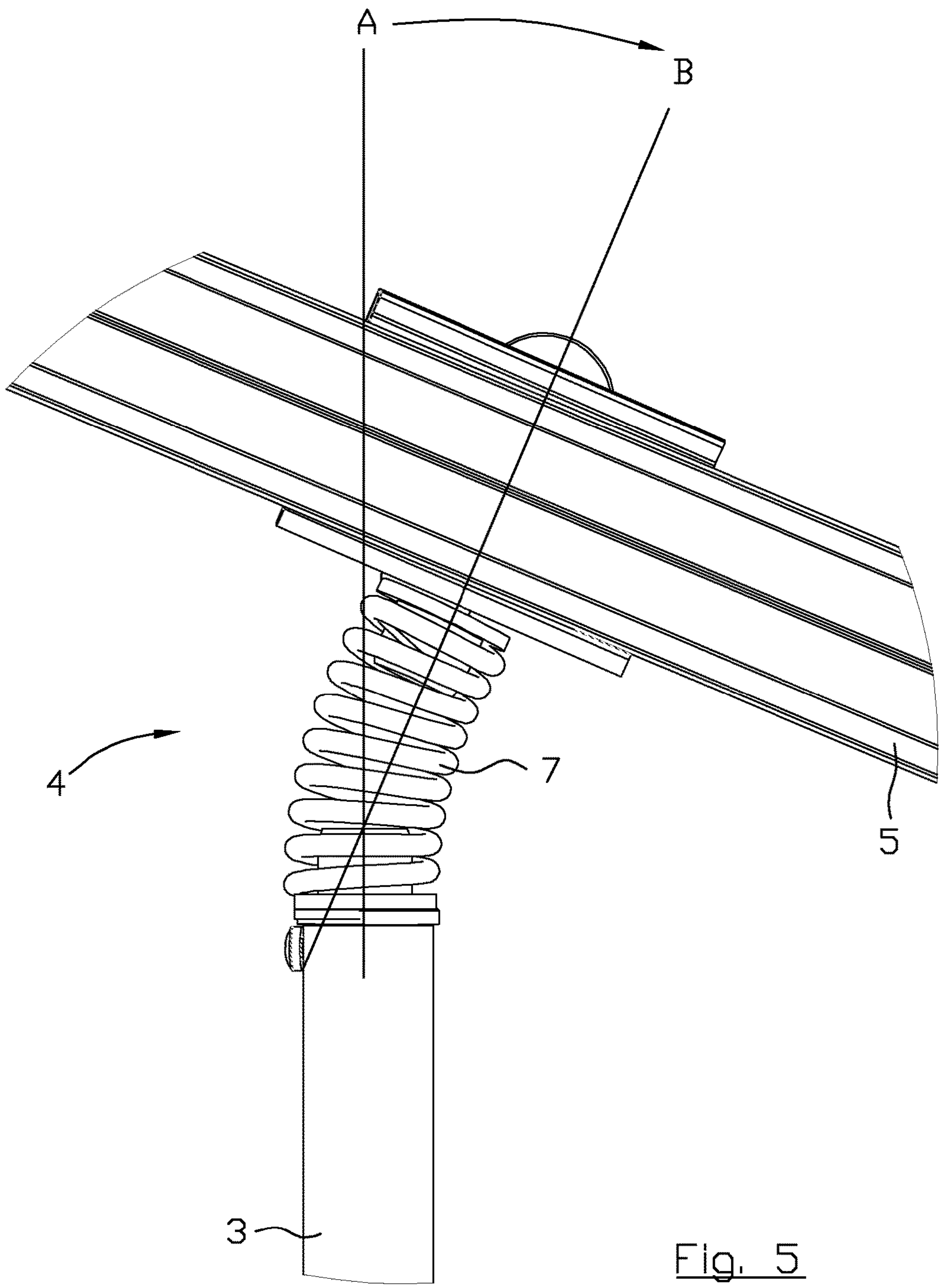
FIG. 5 is an enlarged schematic front view of a coupling device during adjustment of the height of one post.

Referring now to FIGS. 4 and 5 (the lines represent the center axis of the resilient joint 7). FIG. 4 disclose the system during adjustment of the length of the posts 3. By having a resilient joint 7 configured to allow inclination or bending in any direction the length of the posts 3 may be adjusted one at the time in a controllable fashion without damaging the sheet of material. During the length adjustment of for example two adjacent posts (first and second post) with a crossbar extending between the posts 3 the first post will be raised or lowered using the configuration for adjusting the length of the post. The adjustment will place a load on the resilient joints 7 of the two posts 3. This results in that the resilient joint 7 will tilt or bend allowing the holder 6 to go from a first position A at a first angel in relation to the tube to a second position B at a second angle (the arrow represents the change from position A to position B). The post 3 which length has not yet been adjusted may then be adjusted to the same length as the adjusted post resulting in that the resilient joint 7 will return to an unloaded state. It shall be pointed out that the posts 3 may have different lengths during display of the sheet of material 2, and then the resilient joints 7 are in a tilted or bent state during display.

The coupling device may be arranged so that the center axis of the resilient joint 7 extends along the center axis of the corresponding post 3 when the coupling device 4 is in the first position A, FIG. 5. The coupling device 4 may further be arranged so that the center axis of the resilient joint 7 is parallel with the center axis of the corresponding post 3 but the center axis of the joint 7 does not extend along the center axis of the corresponding post 3. In one embodiment the coupling device is arranged so that the center axis of the resilient joint 7 is non-parallel to the corresponding post 3, for example the center axis of the joint 7 is perpendicular to the post 3, i.e. protrudes at an angle in relation to the post 3.

The present invention facilitates displaying a curved sheet of material. Therefore in one embodiment the display system arrangement comprises at least three posts 3 and wherein the crossbar 5 may be curved along the length thereof, in the horizontal direction and/or vertical direction.

The sheet of material 2 may be rolled up and arranged on the crossbar 5 using any suitable means. The sheet of material may be displayed by pulling the sheet of material downwards and by securing it. The sheet of material 2 may also be arranged in a similar manner on a crossbar 5 arranged at the lower ends of the posts 3.

The present invention further relates to a display system comprising a display system arrangement 1 according to the present invention and a sheet of material 2 where the sheet of material may be a fabric or a printed fabric.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A display system arrangement for displaying a sheet of material, the display system arrangement comprising:

at least two length adjustable posts, each of said at least two posts including a coupling device connected thereto, and a crossbar extending between said coupling devices and configured to receive said sheet of material to be displayed, wherein each coupling device comprises a holder for engagement with said crossbar, and a resilient joint that is arranged between the post and said holder and configured to permit an inclination between the post and the holder.

2. The display system arrangement according to claim 1, wherein the resilient joint is configured to allow the holder to incline in any direction.

3. The display system arrangement according to claim 1, wherein each resilient joint is configured to allow the respective holder to be displaced between from a first position at a first angle in relation to the post and a second position at a second angle in relation to the post, when adjusting the length of either of the at least two posts.

4. The display system arrangement according to claim 1, wherein the resilient joint is a coil spring.

5. The display system arrangement according to claim 1, wherein each coupling device is connected to the corresponding post at an upper end thereof.

6. The display system arrangement according to claim 1, wherein the adjustable posts are telescopic masts.

7. The display system arrangement according to claim 1, wherein, for each post, an upper end of the post is hollow and the coupling device of the post comprises a first part inserted into the upper end of the post and wherein the resilient joint is arranged between the first part of the post and the holder.

8. A display system for displaying a sheet of material, wherein the display system comprises a display system arrangement according to claim 1 and a sheet of material.

9. The display system according to claim 8, wherein the sheet of material is a fabric.

* * * * *